United States Patent [19]

Granestrand

[11] Patent Number: 4,756,588
[45] Date of Patent: Jul. 12, 1988

[54] POLARIZATION-INDEPENDENT OPTOELECTRONIC DIRECTIONAL COUPLER

[75] Inventor: Per O. Granestrand, Stockholm, Sweden

[73] Assignee: Telefonaktiebolaget L M Ericsson, Stockholm, Sweden

[21] Appl. No.: 872,657

[22] Filed: Jun. 10, 1986

[30] Foreign Application Priority Data

Aug. 15, 1985 [SE] Sweden .............................. 8503825

[51] Int. Cl.$^4$ ............................ G02B 6/10; G02F 1/00
[52] U.S. Cl. ................................. 350/96.14; 350/96.11; 350/96.12
[58] Field of Search ............... 350/96.11, 96.12, 96.13, 350/96.14, 96.15

[56] References Cited

U.S. PATENT DOCUMENTS

| | | | |
|---|---|---|---|
| 4,012,113 | 3/1977 | Kogelnik et al. | 350/96.14 |
| 4,157,860 | 6/1979 | Marcatili | 350/96.14 |
| 4,243,295 | 1/1981 | Alferness | 350/96.14 |
| 4,262,993 | 4/1981 | Burns et al. | 350/96.14 |
| 4,273,411 | 6/1981 | Alferness | 350/96.14 |
| 4,291,939 | 9/1981 | Giallorenzi et al. | 350/96.14 |
| 4,400,052 | 8/1983 | Alferness et al. | 350/96.12 |
| 4,688,881 | 8/1987 | Jansson | 350/96.12 X |

OTHER PUBLICATIONS

"Polarization-Independent Modulators with Ti:LiNbO$_3$ Strip Waveguides", *Electronic Letters*, vol. 20, No. 12, Jun. 7, 1984.
Steinberg et al., "Performance Limitations Imposed on Optical Waveguides Switches and Modulators by Polarization", *Applied Optics*, vol. 15, No. 10, Oct. 1976.
Tsukada et al., "Polarization-Insensitive Integrated-Optical Switches: A New Approach", IEEE Jour. of Quan. Elec., vol. QE-17, No. 6, Jun. 1981.
Ramer et al., "Polarization-Independent Optical Switch with Multiple Sections of $\Delta\beta$ Reversal and a Gaussian Taper Function", IEEE Journal of Quantum Electronics, vol. QE-18, No. 10, Oct. 1982.
Burns et al., "Interferometric Waveguide Modulator with Polarization-Independent Operation", App. Phys. Lett., vol. 33, No. 11, Dec. 1, 1978.

*Primary Examiner*—John Lee
*Assistant Examiner*—John Ngo
*Attorney, Agent, or Firm*—Burns, Doane, Swecker & Mathis

[57] ABSTRACT

This invention relates to a polarization-independent optoelectronic directional coupler. A wafer (11) e.g. of lithium niobate has light waveguides (13) at its upper surface (12). There are main electrodes (17) and secondary electrodes (18) along the interaction length ($L_1$) of the light waveguides. The wafer is oriented in relation to its crystalline structure (X,Y,Z) such that its optical axis (Z) is in a plane at right angles to the upper surface (12) and contains the longitudinal direction of the waveguides (13). The optical axis (Z) deviates here an angle ($\beta$) of at most 15 degrees from the upper surface (12), and the X axis may have six symmetrically distributed positions, of which one is in the plane of the upper surface (12). Independent of the polarization state of a light beam, this beam entering at an input (14) can be switched in its entirety to either of the outputs (15) of the coupler. With the aid of the secondary electrodes (18) an electrical field through the waveguides can be directed at right angles to the upper surface (12). With the stated orientation of the wafer, the refractive index of the material can be changed hereby so that the desired switching is obtained. The light propagation in the direction of the optical axis (Z) permits high pulse frequency.

6 Claims, 5 Drawing Sheets

POLARIZATION-INDEPENDENT OPTOELECTRONIC DIRECTIONAL COUPLER

TECHNICAL FIELD

This invention relates to a polarization-independent optoelectronic directional coupler including a monocrystalline wafer of optoelectronic material having at its upper surface light waveguides and electrodes along an interaction distance of the waveguides, the crystal material of the wafer having an optical axes (the crystallographic c axis) for which the refractive index has a given value, so that a light ray incident in the direction of the axis is affected by this refractive index independent of the polarization direction of the light ray, the refractive index of the crystal in remaining directions being determined by a refractive index ellipsoid, the axis of rotation of which is the optical axis, the crystal having an axis (the crystallographic a axis) at right angles to the optical axis and which is defined by the crystal lattice.

BACKGROUND ART

Components in integrated optics, e.g. directional couplers and modulators, may be included in fibre-optic systems for information transmissions. These components include a wafer of optoelectronic material, which has light waveguides diffused into its upper surface. Using, for example, a directional coupler, a transmitted signal can be connected to either of the outputs of the coupler. In general, the components have the disadvantage that light with well-defined polarization is required for this switching to function satisfactorily. If the polarization state is indeterminate, the transmitted signal could be divided between the outputs so that an error in signal transmission occurs in the coupler. A well-defined polarization state in transmitted light signals may be retained if the transmission takes place using optical fibres conserving the polarization state. However, these fibres attenuate the light signals rather heavily and are expensive. The polarization state may also be maintained by the transmitted signals being fed back to their source, which requires a regulating system. These difficulties in transmission may be avoided by making the optical components independent of polarization. In Appl. Phys. letters 35 (10), 15 November 1979 pp 748-750, R. C. Alferness, "Polarization-independent optical direction coupler switch using weighted coupling", there is proposed a polarization-independent optical directional coupler, which, however, requires great accuracy in manufacturing the waveguides. In the Journal of Lightwave Technology, Vol. LT-2 No 1 Feb. 1984, Leon Mc Caughan "Low-Loss Polarisation Independent Electrooptical Switches at $\lambda=1.3$ $\mu$m" there is proposed a polarization-independent optical coupler which is somewhat simpler than in the reference just mentioned, but which has poorer switching properties. A large, common disadvantage with the optoelectric components according to the two references is that the upper boundary frequency for transmitted light pulses is low. This is due to the light waveguides being oriented in relation to the crystal structure so that the two polarization directions mutually at right angles in a light wave are affected by different refractive indices in the waveguides. The two polarization directions are therefore propagated through the waveguides with different speeds, so that pulse lengthening occurs, which limits the upper pulse frequency.

DISCLOSURE OF INVENTION

The above-mentioned difficulties are surmounted in accordance with the invention by selecting the orientation of the crystal material and the implementation of the electrodes so that a polarization-independent optoelectronic coupler is obtained, which requies limited manufacturing accuracy and which has a high upper boundary frequency. The invention is characterized by the disclosures in the accompanying claims.

BRIEF DESCRIPTION OF DRAWINGS

The invention will now be described in detail, in connection with a drawing where.

BEST MODE FOR CARRYING OUT THE INVENTION

Figure 1:
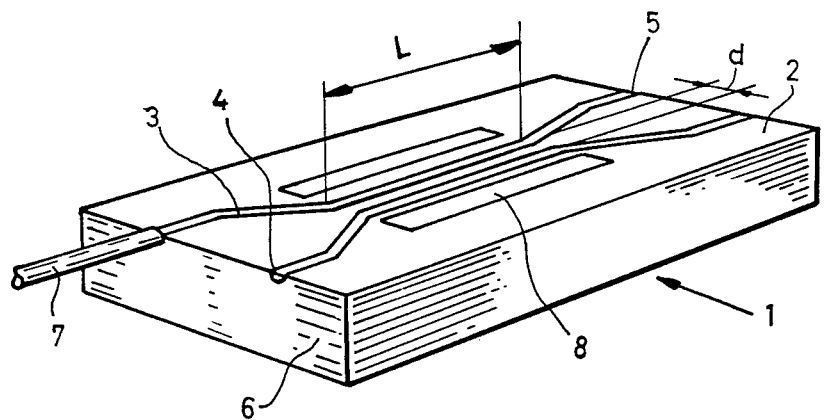
FIG. 1 illustrates a known optoelectronic directional coupler in perspective, seen from above.

A known optoelectronic directional coupler is illustrated in FIG. 1, and includes a mono-crystalline wafer 1 of opto-electronic material, usually lithium niobate or lithium tantalate. At its upper surface 2, the wafer has two waveguides 3, which can be made by diffusing titanium into the surface of the wafer. The waveguides have inputs 4 at one plane end surface 6 of the wafer and outputs 5 at the other. A light wave entering one of the inputs 4 via such as an optical fibre 7 may be distributed between the outputs 5. This is done conventionally by coupled electromagnetic oscillations occurring between the waveguides 3 along their interaction length L. The degree of coupling between the waveguides may be selected by selecting the distance d between them. Variation of the coupling length is thus enabled, this being the length along the interaction length L required for a light wave in one waveguide to be completely switched over to the other waveguide. The distance d can be adjusted so that the coupling length coincides with the length L of the interaction length, a light wave coming into the input of one waveguide being then sent out from the output of the other waveguide. The degree of coupling between the waveguides may be affected by the refractive index of the crystal being changed by an electric field applied between electrodes 8 along the interaction length L. The field strength can be selected such that the coupling between the waveguides ceases, whereby a light wave entering at the input of one waveguide is sent from the output of the same waveguide. As mentioned above, there is the desire here of being able to steer the incoming lightwave between the outputs of the directional coupler independent of the polarization state of the light wave. It is also a desire that the directional coupler will be simple and will allow the incoming light wave to have high pulse frequency.

Figure 2:
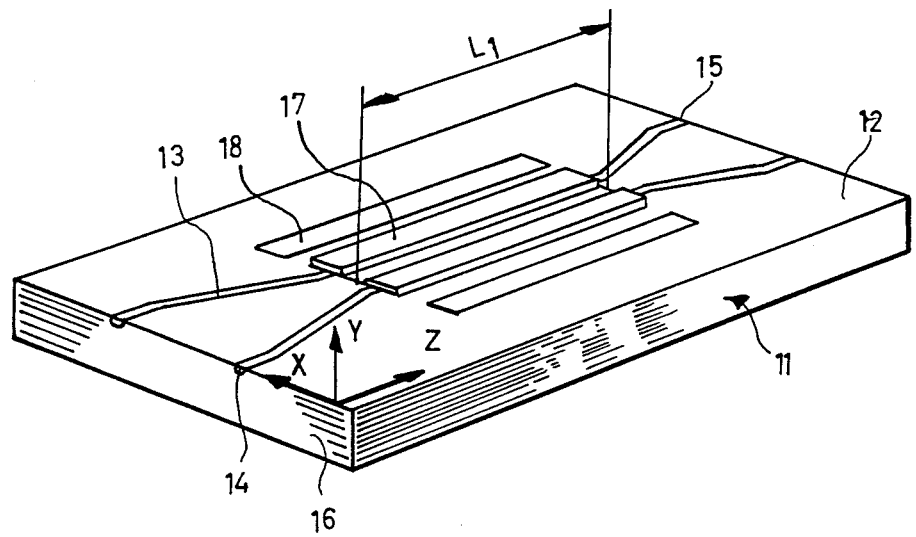
FIG. 2 illustrates an inventive directional coupler in perspective seen from above.
Figure 4:
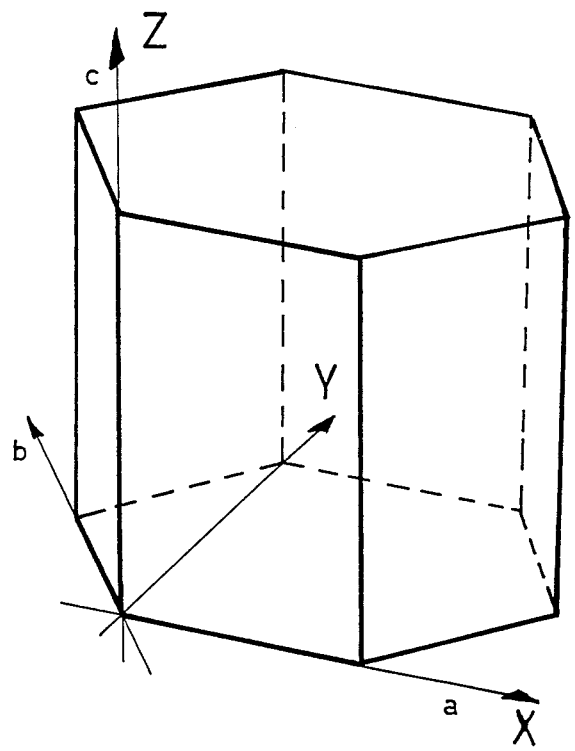
Figure 5:
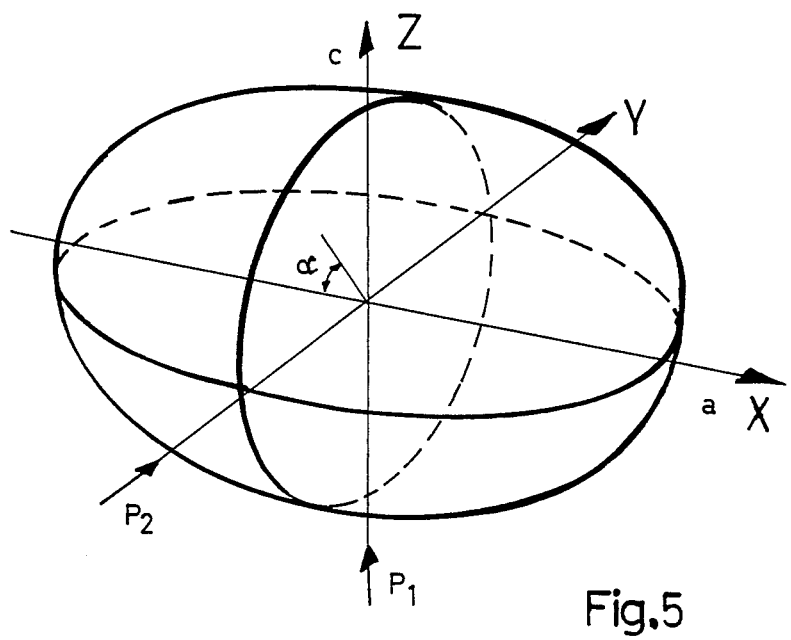
FIG. 5 illustrates a rotational ellipsoid describing the values of the refractive index of lithium niobate.

The above desires are satisfied by a directional coupler, which will be described in connection with an embodiment illustrated in FIG. 2. The directional coupler conventionally includes a wafer 11 of optoelectronic material, having two waveguides 13 at its upper flat surface 12. The waveguides have inputs 14 at one end surface 16 of the wafer and outputs 15 at its other end surface 16. In accordance with the invention, the wafer 11 is oriented in a particular way in relation to its crystalline structure, as will be described in connection with FIGS. 4, 5 and 6. Also in accordance with the invention, the directional coupler has on its upper surface 12 main electrodes 17 and secondary electrodes 18 along the interaction length L of the waveguides, these electrodes being illustrated in cross section in FIG. 3. The waveguides 13 have a somewhat greater refractive index than the crystal material in the wafer and are covered by a buffer coating 19. The refractive index of the latter is somewhat lower than that of the wafer material, resulting in that the light is given a more uniform power distribution over the cross section of the waveguides 13. Examples of suitable material for the buffer coating are cadmium oxide or silicon nitride when the directional coupler is made from lithium niobate. The main electrodes 17 are placed on top of the buffer coating and may be connected to a voltage source with the pole voltage $U_h$ via electrical connection conductors 21. With this voltage source connected, an electrical main field $E_h$ runs through the crystal between the main electrodes, and passes through the waveguides to affect their refractive index. Spaced from the main electrodes, the secondary electrodes 18 extend along the surface of the wafer parallel to the main electrodes and are provided with elecrical connection conductors 22. The conductors 21 and 22 may be connected in pairs to voltage sources with the pole voltages $U_1$ and $U_2$, respectively, the electrical secondary fields $E_1$ and $E_2$ respectively being generated such as to pass through the respective waveguides 13. The direction of the main electrical field $E_h$ differs from the directions of the secondary fields in the respective waveguides. The direction of the resulting field through the waveguides may be adjusted by changing the voltages $U_1$ and $U_2$ to the secondary electrodes. The importance of this adjustment facility will be explained below in connection with FIG. 6.

It has been mentioned above that the inventive wafer 11 shall have a particular orientation in relation to the crystal structure of the material in it. A wafer material, e.g. lithium niobate, has its crystal structure schemically illustrated in FIG. 4, where there is also shown the orientation of a right-angular right-hand coordinate system X, Y, Z in relation to the hexagonal unit cell normally used for the material, with its associated crystallographic a, b, c co-ordinate system. The axes in this coordinate system have been selected such that the X-axis points in the direction of the crystallographic a-axis and the Z-axis in the direction of the crystallographic c-axis, which is the optical axis. A closer description of the crystal structure for lithium niobate is to be found in such as J. Phys. Chem. Solids, Pergamon Press 1966, Vol 27. pp. 997–1012, "Ferroelectric Lithium Niobate. 3. Single Crystal X-ray Diffraction Study at 24° C.". Lithium Niobate has double refractive indices and its refractive index is described by a rotational ellipsoid as illutrated in FIG. 5. The intersection of the ellipsoid with the X-Y plane is a circle, and its intersection with the X-Z plane is an ellips, the major axis of which is the diameter of the circle. A monochromatic light beam P1 in the direction of the Z-axis is affected in the cyrstal by a refractive index with a magnitude corresponding to the radius of the circle. The magnitude of the refractive index is independent on the light beam polarization direction and all polarization directions of the light beam propagate themselves through the crystal at the same rate. A plane-polarized monochromatic light beam P2 in the X-Y plane is affected by a refractive index, the magnitude of which depends on the angle of inclination $\alpha$ of the polarization plane in relation to the X-Y plane. Light beams having the same direction but different polarization planes propagate themselves through the crystal at different rates. The result of this is that a light pulse containing light with different polarization directions will have the pulse lengthened when it passes through the crystal, if the direction of the light beam deviates heavily from the Z axis direction. In turn, the pulse lengthening limits the highest pulse frequency with which a component made from the crystal material can work. To obtain a component with high upper pulse frequency, the orientation of the wafer 11 is selected such that the direction of the waveguides 13 substantially coincides with that of the Z axis, as with an example illustrated in FIG. 6. The oscillation modes in a light wave, the TE mode with the polarization plane at right angles to the upper plane 12, and the TM mode with the polarization plane in the plane of the upper surface, then have a common propagation rate in the waveguides 13.

Figure 3:
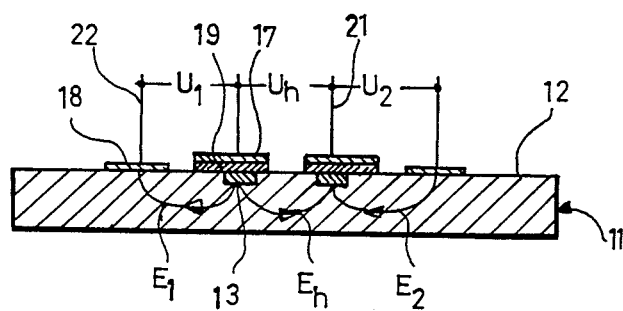
FIG. 3 is a cross section through the inventive coupler, with its electrodes, FIG. 4 schematically illustrates the hexagonal crystalline structure of lithium niobate.
Figure 6:
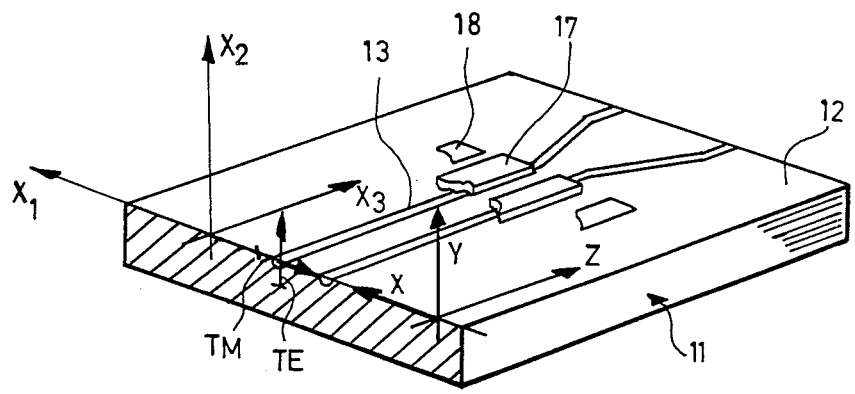
FIG. 6 is a perspective view of part of the directional coupler, with the axes of the crystal material oriented in accordance with the invention, FIG. 7 schematically illustrates in perspective a directional coupler with a further inventive orientation of the axes of the crystal material
Figure 7:
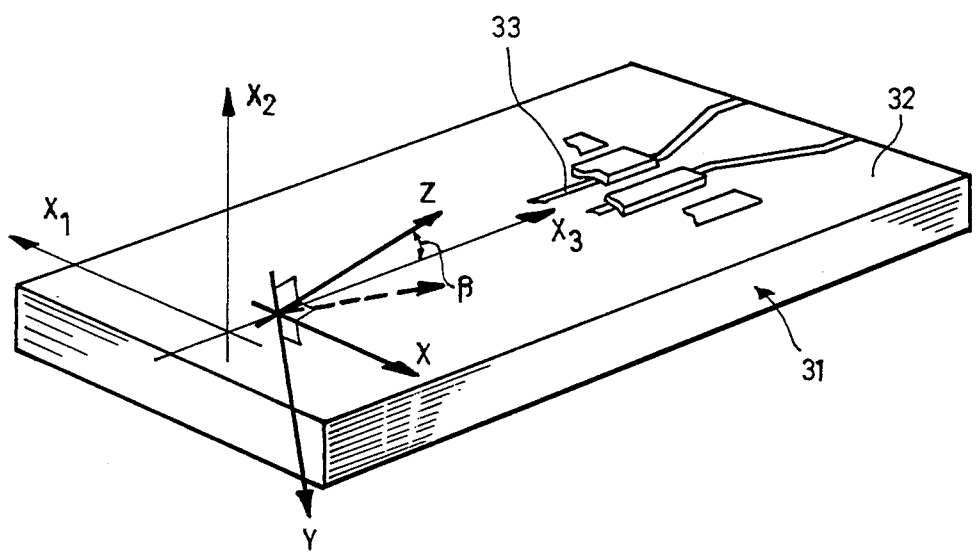

It was mentioned in connection with FIG. 1 that the coupling degree between the waveguides 3 of the directional coupler may be affected by an electric field in the crystal. The electric field changes the shape of the refractive index ellipsoid illustrated in FIG. 5, this being known as Pockel's effect for weak electric fields. A more detailed description of this effect is to be found in Kaminov, "An introduction to electrooptic devices," Academic Press, New York and London 1974. The change is described matematically in the most general three-dimensional case, by a third rank tensor with 27 tensor elements. These are usually denoted $r_{ij,k}$ where the indices i, j and k may assume the values 1, 2 or 3. The indices refer to a right-angular right-hand coorindate system with the axes $x_1$, $x_2$ and $x_3$ having their directions selected here as illustrated in FIG. 6. The $x_1$ axis is parallel to the upper surface 12 and at right angles to the waveguides 13, the $x_2$ axis is at right angles to the upper surface 12 and the $x_3$ axis is parallel to the waveguides 13. The tensor elements $r_{ij,k}$ have the physical dimensions of length per electrical potential difference (meters per volt), which is a measure of the change in coupling degree between the oscillation modes achieved by the electrical field. The most general case, where all 27 elements of the tensor are of interest, is considerably simplifed in the special case dealing with the present inventive directional coupler. According to FIG. 6, the waveguides extend in the $x_3$ axis direction so that a light wave in the waveguide has electric field vectors in the $x_1$-$x_2$ plane only. Similarly, the electrical fields $E_1$ $E_2$ and $E_h$ applied between the electrodes only have components in the $x_1$-$x_2$ plane, as illustrated in FIG. 3. The problem is thus reduced to two dimensions and the number of elements $r_{ij,k}$ of interest are reduced to 8, namely: $r_{12,1}$, $r_{12,2}$, $r_{21,1}$, $r_{21,2}$, $r_{11,1}$, $r_{11,2}$, $r_{22,1}$, and $r_{22,2}$. The number of elements is further reduced when, for reasons of symmetry, $r_{21,1}=r_{21,2}$ and $r_{12,2}=r_{12,2}$. The remaining tensor elements $r_{ij,k}$ describe how the refractive index in the wafer 11 according to FIGS. 2 and 6 is changed by the exterior electrical fields $E_h$, $E_1$ and $E_2$. These changes of the refractive index affect the coupling degree between the oscillation modes TM and TE along the interaction length $L_1$ of the two waveguides 13. The magnitude of the tensor elements in the different orientations of the wafer 11 is determined by the coordinate transformations between the two systems of coordinate X, Y, Z and $x_1$, $x_2$ and $x_3$. As mentioned above it is a desire that the directional coupler will be independent of polarization. In accordance with the invention this desire is satisfied by the orientation of the mono-crystalline wafer 11 being selected in the following way. The tensor element $r_{11,2}$, describes the refractive index change deciding the coupling between the TE modes in the two waveguides 13, and it is given the same absolute value as the tensor elements $r_{22,2}$, which decides the coupling between the TM modes in a corresponding way. The tensor elements $r_{11,1}$, $r_{22,1}$ and $r_{12,2}$ are all given the values 0. By performing the mentioned coordinate transformations it can be shown that such selections of tensor elements are possible for the optoelectronic crystal material in question. However, it has been found that the element $r_{12,1}$, deciding the coupling between the TM and TE modes will differ from zero. If this coupling between the two separate modes is present, it means that the directional coupler is not polarization-independent. In accordance with the invention this coupling is counteracted with the aid of the electrical secondary fields $E_1$ and $E_2$, described in connection with FIG. 3. The strength of the secondary fields can be changed so that the direction of the resulting field through the waveguides 13 is at right angles to the upper surface 12 of the wafer 11. The effect on the refracive index of the crystal represented by the tensor element $r_{21,1}$ is inhibited thereby, so that the coupling between the TM and TE modes disappears entirely. By the selection described above of the orientation of the wafer 11 there is not only met the requirement that the directional coupler will be polarization-independent, but also the requirement that the direction of the waveguides subtantially coincides with the direction of the optical axes as mentioned in conjunction with FIG. 5, and which will be more closely described for a lithium niobate directional coupler. When the above-mentioned coordinate transformations between the systems $x_1$, $x_2$, $x_3$ and X, Y, Z have been carried out for this material there is obtained essentially two separate orientations of the mono-crystalline wafer. In FIG. 6 there is shown one of these orientations in which the X axis has the same directions as the $x_1$ axis, the Y axis the same direction as the $x_2$ axis and the Z axis the same direction as the $x_3$ axis. The tensor elements then have the following values:

$r_{11,}=0$ $r_{22,1}=0$ $r_{12,1}=5.7\times 10^{-12} m/v$ $r_{12,2}=0$ $r_{11,2}=-5.7\times 10^{-12} m/v$ $r_{22,2}=5.7\times 10^{-12} m/v.$ Due to symmetry properties pertaining to lithium niobate there are further orientations of the mono-cyrstalline wafer 11, which are equivalent to the orientation given in FIG. 6. In such a case the Z axis has unaltered direction and the X axis has six positions at 60 degrees spacing, of which one position is that illustrated in FIG. 6. The second of these two orientations is illustrated in FIG. 7. A mono-crystalline wafer 31 has waveguides 33 on its upper flat surface 32 in a manner as described for FIG. 6, and the coordinate system $x_1$, $x_2$, $x_3$ is oriented, as also described in this Figure. The crystallographic coordinate system X, Y, Z is oriented in the following manner. The X axis is parallel to the $x_1$ axis and points in its negative direction. The Z axis is in the $x_2$-$x_3$ plane and deviates from the $x_3$ axis at an angle of $\beta=10,15°$. The tensor elements have the following values:

$r_{11,1}=0$ $r_{22,1}=0$ $r_{12,1}=11.25\times 10^{-12} m/v$ $r_{12,2}=0$ $r_{11,2}=7.4\times 10^{-12} m/v$ $r_{22,2}=7.4\times 10^{-12} m/v$ Due to the symmetry properties of lithium niobate, there are equivalent orientations of the mono-crystalline wafer 3 here as well. The Z axis has the direction illustrated in FIG. 7, or is in the $x_2$-$x_3$ plane and directed downwards at an angle $\beta$, as indicated by the dashed arrow. The X axis has positions at 60 degrees spacing, one of these positions being the one illustrated in FIG. 7, with the X axis parallel to the upper surface of the wafer.

In the two embodiments described above for lithium niobate directional coupler, the orientation of the mono-crystalline wafer and the size of the tensor elements is applicable if the light wave length $\lambda=1.3$ $\mu$m. In both embodiments, the light in the waveguides propagates itself substantially in the direction of the optical axis, the Z axis, so that light waves with different polarization directions propagate themselves at the same rate. The two sensor elements $r_{11,2}$ and $r_{22,2}$ have the same absolute value so that the coupling between the TE modes and the TM modes in the two waveguides is changed to the same degree by the electrical fields through the waveguides. The tensor element $r_{12,1}$ differs from zero, but its effect is inhibited by the secondary electrical fields $E_1$ and $E_2$. The directional coupler will thus be polarization-independent and it will have a high upper boundary frequency. The directional coupler has the advantage that its manufacture only requires limited accuracy. Minor deviations in the shape of the electrodes can be compensated by altering the strength of the secondary electric fields.

Figure 8:
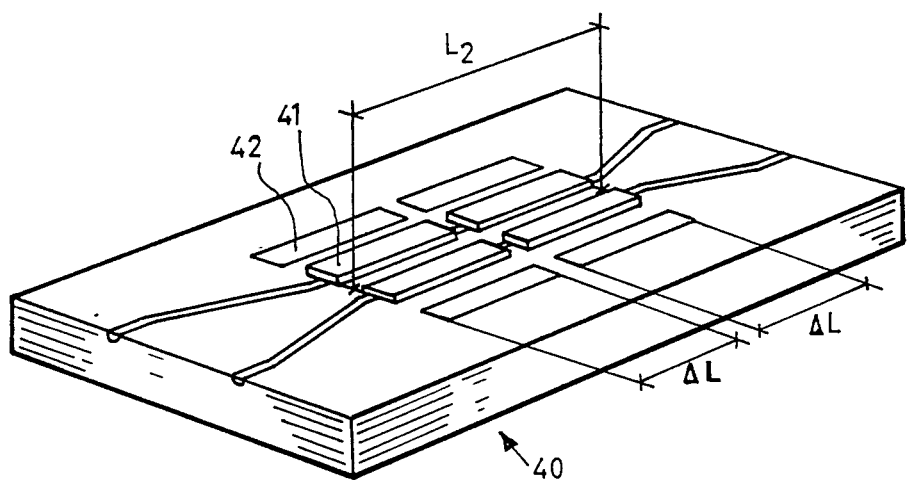
FIG. 8 illustrates an inventive directional coupler with parted electrodes.

The invention can be applied to a directional coupler 40, the main electrodes 41 and secondary electrodes 42 of which are diveded into sections $\Delta L$ along an interaction length $L_2$, as is schematically illustrated in FIG. 8. A description of electrodes of this type is to be found in IEEE Journal of Quantum Electronics, Vol. QE—12, No. 7, July 1976, H. Kogelnik and R. Schmidt:

"Switched Directional Couplers with Alternating Δβ". These electrodes have the advantage that accuracy requirements in their manufacture are compartively low.

What is claimed is:

1. Polarization-independent optoelectronic directional coupler including a mono-crystalline wafer of optoelectronic material having at its upper surface light waveguides and electrodes along an interaction distance of the waveguides, the crystal material of the wafer having an otpical axis, the crystallographic c axis, for which the refractive index has a given value so that a light ray incident in the direction of the axis is affected by this refractive index independent of the polarization direction of the light ray, the refractive index of the crystal in remaining directions being determined by a refractive index ellipsoid, the axis of rotation of which is the optical axis, the crystal having an axis (the crystallographic a-axis) at right angles to the optical axis and which is defined by the crystal lattice, characterized in that the electrodes include main electrodes (17) substantially covering the waveguide (13) along the interaction length ($L_1$) and secondary electrodes (18) spaced from the main electrodes (17), the latter being between the secondary electrodes so that with the aid of the electrodes there may be generated electrical fields ($E_h$, $E_1$, $E_2$) the resultant of which in each waveguide is at right angles to the upper surface (12), in that the optical axis (c, Z) is in a plane ($x_2$–$x_3$) which includes the longitudinal direction of the waveguides (13) and is at right angles to the upper surface (12), and in that the optical axis (c, Z) is directed between two extreme positions, of which one is parallel to the upper surface (12) and the other forms an angle ($\beta$) with the upper surface which is less than 15 degrees, said crystallographic a-axis being able to assume six alternative positions at 60 degrees spacing, of which one is parallel with the plane of the upper surface (12).

2. Polarization-independent optoelectronic directional coupler as claimed in claim 1, characterized in that the optical axis (c, Z) is parallel to the upper surface (12) of the wafer.

3. Polarization-independent optoelectronic directional coupler as claimed in claim 2, characterized in that the material in said monocrystalline wafer is lithium niobate.

4. Polarization-independent optoelectronic directional coupler as claimed in claim 1, characterized in that the angle ($\beta$) between the upper surface (12) and the optical axis (c,Z) is 10,15 degrees whereby the coupler is adapted for the light wave length 1.3 $\mu$m.

5. Polarization-independent optoelectronic directional coupler as claimed in claim 4, characterized in that the material in said monocrystalline wafer is lithium niobate.

6. Polarization-independent optoelectronic directional coupler as claimed in claim 1, characterized in that the material in said monocrystalline wafer (11) is lithium niobate.

* * * * *